J. E. STRODE.
Wagon-Fender.

No. 69,722.　　　　　　　　　　　　　　　　Patented Oct. 8, 1867.

United States Patent Office.

JAMES E. STRODE, OF CARROLLTON, ILLINOIS, ASSIGNOR TO HIMSELF AND THOMAS H. STRODE, OF THE SAME PLACE.

Letters Patent No. 69,722, dated October 8, 1867.

IMPROVEMENT IN WAGON-BRACE AND FENDER.

The Schedule referred to in these Letters Patent and making part of the same.

TO ALL WHOM IT MAY CONCERN:

Be it known that I, JAMES E. STRODE, of Carrollton, in the county of Greene, and State of Illinois, have invented a new and improved Wagon-Bed Brace and Fender; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
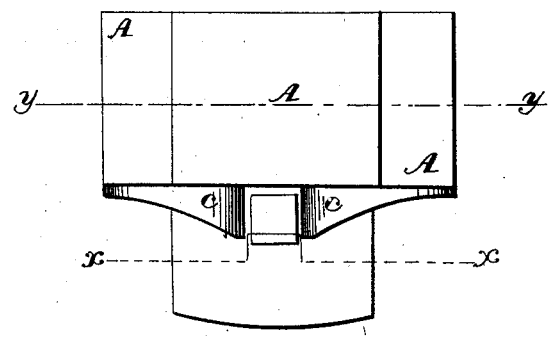
Figure 1 is a top view of my improved wagon-bed brace and fender, showing in red lines the relative position of the bolster and stake.
Figure 2:
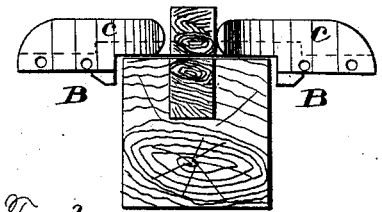
Figure 2 is a side view of the same partly in section, through the line $x\,x$, fig. 1.
Figure 3:
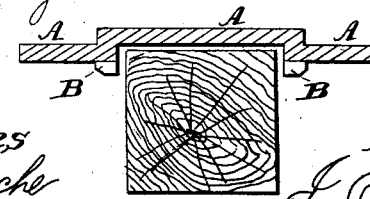
Figure 3 is a detail sectional view of the same, taken through the line $y\,y$, fig. 1.

My invention has for its object to furnish a protection to the bottom and sides of the wagon-bed, and also a stay to hold the bed to its place; and it consists of a plate, having jaws at one side to clasp the stake, and flanges or shoulders upon its lower side to clasp the bolster, the whole being constructed and arranged as hereinafter more fully described.

A is a plate, which I prefer to make of iron, and which is formed with shoulders or flanges B upon its under side to fit upon or clasp the bolster, so as to act as a stay or brace to hold the wagon-bed to its place. C are jaws, formed upon or attached to the outer side or edge of the plate A to clasp the stake, and thus assist in holding the wagon-bed to its place. The jaws C project above the plate A, and thus act as a stay or brace to the sides of the wagon-bed. The plate A also acts as a fender in receiving the jar, instead of allowing it to come upon the plank of the wagon-bed.

This device is designed to take the place of the wooden cleats now generally attached to wagon-beds to keep them in place upon the bolsters.

I claim as new, and desire to secure by Letters Patent—

The plate A, having shoulders or flanges B formed upon or attached to its under side, and jaws C formed upon or attached to its outer edge or side, substantially as herein shown and described, and for the purpose set forth.

JAMES E. STRODE.

Witnesses:
JESSE N. STRODE,
JESSE KEELEY.